US012685999B2

(12) United States Patent
Wang et al.

(10) Patent No.: US 12,685,999 B2
(45) Date of Patent: Jul. 21, 2026

(54) SULFUR TOLERANT CATALYST, CATALYST SYSTEMS, AND METHODS OF CATALYTIC HYDROTHERMAL GASIFICATION

(71) Applicant: Battelle Memorial Institute, Pacific Northwest National Laboratories, Richland, WA (US)

(72) Inventors: Huamin Wang, Richland, WA (US); Todd R. Hart, Richland, WA (US); Andrew J. Schmidt, Richland, WA (US); Mariefel V. Olarte, Richland, WA (US); Suh-Jane Lee, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 528 days.

(21) Appl. No.: 18/448,899

(22) Filed: Aug. 11, 2023

(65) Prior Publication Data

US 2025/0050315 A1     Feb. 13, 2025

(51) Int. Cl.
| | |
|---|---|
| *B01J 27/051* | (2006.01) |
| *B01J 21/18* | (2006.01) |
| *B01J 37/02* | (2006.01) |
| *B01J 37/20* | (2006.01) |
| *B09B 3/40* | (2022.01) |
| *B09B 3/70* | (2022.01) |
| *C01B 3/02* | (2026.01) |
| *C10L 3/08* | (2006.01) |

(52) U.S. Cl.
CPC ........... *B01J 27/0515* (2013.01); *B01J 21/18* (2013.01); *B01J 37/0205* (2013.01); *B01J* *37/20* (2013.01); *B09B 3/40* (2022.01); *B09B* *3/70* (2022.01); *C01B 3/02* (2013.01); *C10L* *3/08* (2013.01)

(58) Field of Classification Search
None
See application file for complete search history.

(56) References Cited

U.S. PATENT DOCUMENTS

| | | | | |
|---|---|---|---|---|
| 10,252,247 B2 * | 4/2019 | Choi | ....................... | C10G 45/04 |
| 2007/0264174 A1 * | 11/2007 | Willigan | .................. | B01J 37/03 |
| | | | | 422/222 |
| 2009/0263316 A1 * | 10/2009 | Iyer | ......................... | C01B 3/386 |
| | | | | 423/658.3 |
| 2013/0255153 A1 * | 10/2013 | Sasaki | ........................ | C10J 3/82 |
| | | | | 48/128 |
| 2013/0331623 A1 * | 12/2013 | Elliott | ..................... | C10B 49/16 |
| | | | | 44/307 |
| 2014/0275584 A1 * | 9/2014 | Beck | ......................... | B01J 29/46 |
| | | | | 568/903 |

* cited by examiner

*Primary Examiner* — John J Figueroa
(74) *Attorney, Agent, or Firm* — Derek H. Maughan; Frank Rosenberg

(57) ABSTRACT

Ru—Mo sulfide bimetallic catalysts are disclosed for catalytic hydrothermal gasification (CHG) of aqueous streams produced from hydrothermal liquefaction of wet wastes. This catalyst is sulfur resistant and requires less Ru loading compared to the current catalyst, which addresses the most critical challenges for CHG. The CHG process with this catalyst converts the aqueous stream to $CH_4$, $H_2$, $CO_2$, and other light hydrocarbons as well as cleaned water that can be recycled or released into the environment.

21 Claims, 5 Drawing Sheets

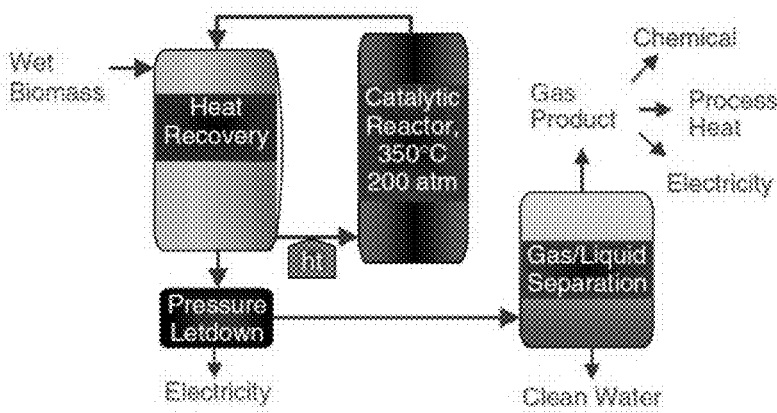
Figure 1          PRIOR ART
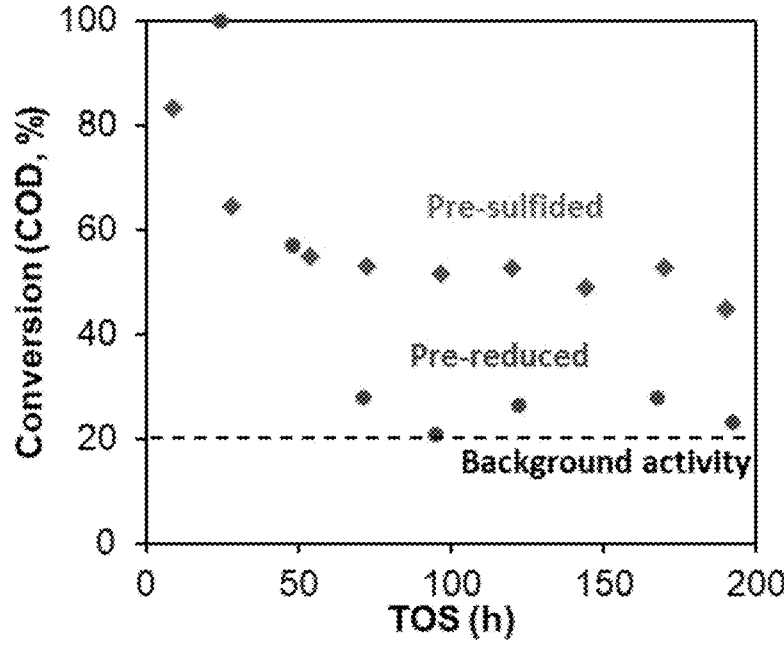
Figure 2

SULFUR TOLERANT CATALYST, CATALYST SYSTEMS, AND METHODS OF CATALYTIC HYDROTHERMAL GASIFICATION

ACKNOWLEDGEMENT OF GOVERNMENT SUPPORT

This invention was made with Government support under Contract DE-AC0576RL01830 awarded by the U.S. Department of Energy and under a Cooperative Research and Development Agreement (CRADA No. 387) between Southern California Gas Company and Pacific Northwest National Laboratory, which is operated for the United States Department of Energy. The Government has certain rights in this invention.

INTRODUCTION

Gasification is a known technique for converting biomass and organic waste into gaseous products such as synthesis gas, which consists of carbon monoxide and hydrogen. This process involves the thermal decomposition of biomass and organic waste in a controlled environment with a series of chemical reactions including pyrolysis and/or partial oxidation. Many of the existing methods require a dry feedstock containing less than 10 wt. % moisture. However, a significant portion of the biomass and organic waste resource contains higher levels of moisture, more typically 50 wt. %, and some even consist of wet biomass/waste or biomass/waste in water slurries with 85 wt. % water or more. To efficiently process such water-rich feedstocks, one approach is to conduct gasification in a pressurized water environment using an active catalyst, a technique known as catalytic hydrothermal gasification (CHG).

CHG can break down low-value organic matter dispersed in biomass slurry, wastewater, and other aqueous streams, in a high-temperature high-pressure liquid phase, to gas products, such as methane, other hydrocarbons, and hydrogen. It can destroy bioactive organic compounds, suitable for wastewater in which no other treatment processes are effective, such as wastewater from chemical and semiconductor plants. A catalyst is needed to allow low-temperature operation while maintaining useful conversion. The Pacific Northwest National Laboratory (PNNL) has developed this technology with a CHG catalyst of ruthenium (Ru) on a graphite substrate, selected for its effectiveness in reduced metal form. See, for example, Elliott et al., U.S. Pat. No. 8,241,605 which is incorporated herein as if reproduced in full below.

An important source of wastewater for the CHG process is the aqueous product from a process known as hydrothermal liquefaction (HTL). HTL converts organic feedstocks such as wastewater sludge, food waste, and algae at high temperatures (200-400° C.) and pressures (>4 MPa) to produce biocrude, char, gas, and organic compounds that partition into the aqueous phase. This process is known from publications such as Maddi et al. "Quantitative Characterization of Aqueous Byproducts from Hydrothermal Liquefaction of Municipal Wastes, Food Industry Wastes, and Biomass Grown on Waste." ACS Sustainable Chemistry & Engineering 5, no. 3:2205-2214. 2017. PNNL-SA-121413. doi:10.1021/acssuschemeng.6b02367 and Elliott et al., U.S. Pat. No. 11,407,946 which is incorporated herein as if reproduced in full below. The HTL stage converts approximately 60% of the organic matter in the feedstock (by carbon) into bio-crude. There are around 25% of the carbon in the feedstock stays in the HTL aqueous product, which can be converted to gas by the CHG process. The goal of the CHG stage is to achieve high conversion (90%) of the remaining organic matter to gas, leaving the residual water sterile and recyclable to the headworks of a water resource recovery facility (WRRF). However, the HTL aqueous phase from wet wastes, such as wastewater sewage sludge, food waste, manure, and others, contains a fair amount of sulfur in both organic and inorganic forms at concentrations of over 200 ppm. Like many other reduced metal catalysts, Ru is deactivated or poisoned by exposure to sulfur, among other contaminants. In general, deactivated Ru cannot be reactivated or restored except by removing and returning it for remanufacturing. Therefore, there is a need for a sulfur-resistant catalyst to enable CHG processing of HTL aqueous waste streams and other contaminated feedstocks.

SUMMARY OF THE INVENTION

The present invention includes catalysts for Catalytic Hydrothermal Gasification (CHG) which is resistant to sulfur contaminants in the feedstock, continuous flow fixed bed catalyst systems using the catalyst, and a process for CHG of biomass-derived aqueous steams, biomass slurry, or wastewater to gaseous products using the catalysts and catalyst systems.

The catalyst used for this CHG process is a ruthenium sulfide-based catalyst with a secondary component such as molybdenum supported on a support such as carbon. This type of catalyst can be synthesized by the conventional impregnation method. The catalyst is sulfided in the reactor before the CHG reaction. In one instance, the working catalyst contains 0.5-2 wt % Ru, 10-14 wt % Mo, 6-10 wt % S, and carbon support.

The catalyst is used in a continuous flow fixed bed reactor where the feedstock is passed over the catalyst bed upflow for its conversion. The reactor is operated at subcritical water conditions. In one instance, the reactor is operated at 330-370° C. and liquid hourly space velocity (LHSV) of 0.4-0.7 L/L/h.

The CHG process converts feedstocks to gaseous products by reactions involving thermal decomposition, steam reforming, water-gas-shift reaction, and methanation. In one instance, an HTL aqueous product containing 110-140 ppm sulfur and a chemical oxygen demand (COD) of 55000-65000 mg/L is processed using the catalyst described here. The steady-state COD conversion may be, for example, 65-80% and the produced gas contains 35-50 mol % $CH_4$, 3-10 mol % $H_2$, 10-25 mol % $C_2$+ alkanes, and 25-40 mol % $CO_2$.

In one aspect, the invention provides a CHG catalyst, comprising: a mixture of Ru and Mo disposed on the surface of a support; wherein the support comprises carbon or a metal oxide; Ru in a range of 0.1 to 10 wt %; Mo in a range of 1 to 30 wt %; and S in a range of 1 to 30 wt %.

The catalyst in any inventive aspect may comprise one or any combination of the following: wherein Ru is preferably 0.2 to 5 wt or 0.2 to 3 wt %; Mo is 2 to 25% or 5 to 25%, or 8 to 20%; and wherein the support comprises at least 50 wt %, or at least 60 or at least 70 wt % of the catalyst; further comprising at least 1 wt % W; wherein the support comprises C, $TiO_2$ or $ZrO_2$; wherein the support comprises activated carbon; wherein the Mo is in the form of sulfided Mo; wherein the Ru is in the form of sulfided Ru; wherein the atomic ratio of Ru/Mo is in the range of 1/50 to 1/1 and the atomic ratio of S/(Ru+Mo) is in the range of 1/5 to 3/1; wherein the catalyst has a catalyst stability characterizable as follows:

when tested using an aqueous product comprising:
  COD: 55,000-65,000 mg/L
  Total carbon: 1.65-1.80 wt %
  Sulfur: 110-140 ppm
  Nitrogen: 0.2 to 0.8 wt %
  Major organic compounds:
    Carboxylic acids (0.8 to 1.4 wt %): acetic acid (0.4 to 0.8 wt %), propanoic acid (0.1 to 0.4 wt %), butanoic acid (0.1 to 0.4 wt %).
    Phenolics (0.05 to 0.25 wt %): phenol (0.02 to 0.15 wt %), cresol (0.04 to 0.20 wt %
    Alkanols (0.10 to 0.30 wt %): ethanol (0.04 to 0.20 wt %), propanol (0.04 to 0.20 wt %), butanol (up to 0.1 wt %)
    Aldehydes and ketones (0/05 to 0.20 wt %): furfural (up to 0.1 wt %), butanone (up to 0.1 wt %), pentanone (up to 0.1 wt %), hexanone (up to 0.1 wt %).
  Major inorganic species: Si up to 300 ppm), K up to 300 ppm), Na (up to 300 ppm) balance is water;
at a temperature of 350° C. or 370° C., LHSV of 0.54 L/L/h, and pressure of 2750 psi; possesses a steady state conversion of at least 50% COD conversion is maintained for at least 60 hours, or in the range of 60 to 200 hours (throughout the specification, "steady state" conversion means that there is a 5% or less change in COD conversion (e.g., from 59 to 55% COD conversion is 4% change) over the period measured); wherein the catalyst lacks crystallites as characterizable by the absence of sharp peaks in an x-ray diffraction spectrum; wherein the catalyst comprises $MoS_2$ as characterizable by an x-ray diffraction spectrum; and/or wherein the catalyst comprises Ru—S coordination but no Ru—Ru coordination as characterizable by EXAFS.

The invention also provides a catalyst system, comprising: a reactor vessel comprising an aqueous mixture of the CHG catalyst and biomass. The catalyst system can also be described as having a reaction temperature of 350° C. to 370° C.

In another aspect, the invention provides a method of making a CHG catalyst, comprising: providing a catalyst intermediate comprising: Ru in a range of 0.1 to 10 wt % and Mo in a range of 1 to 30 wt % on a catalyst support; and sulfiding the catalyst at a temperature from about 200° C. to about 450° C. in the presence of a sulfiding agent.

The method of making a catalyst (and the catalyst or catalyst system can be made) may further comprise one or any combination of the following: further wherein the sulfiding step is conducted in the presence of $H_2$; wherein the sulfiding agent comprises $H_2S$ and, optionally, other sulfur-containing organics; wherein the sulfiding agent comprises di-tert-butyl disulfide; wherein the sulfiding step is conducted in an organic solvent; wherein the organic solvent is decane.

In a further aspect, the invention provides a method of converting a biomass feedstock into vapor products, comprising: providing an aqueous biomass mixture; passing the mixture into a chemical reactor comprising the catalyst under hydrothermal conditions of at least 150° C. but below supercritical conditions; wherein the mixture reacts in the chemical reactor; and collecting a vapor product stream from the chemical reactor. Preferably, the catalyzed reaction is conducted at a temperature of at least 200 or at least 300° C. or in the range of 250 to 400° C. Preferably, pressure is 2500 psi or greater. LHSV is preferably at least 0.1 or in the range of 0.25 to 2.0 L/L/h.

A major advantage of the catalyst, the catalyst system, and the process is sulfur tolerance. The reduced Ru catalyst used in the prior art for CHG suffers catalyst deactivation by sulfur poisoning. Biomass-derived feedstock, such as the HTL aqueous phase from wet wastes (wastewater sewage sludge, food waste, manure, and others) contains a fair amount of sulfur in both organic and inorganic forms at concentrations of over 200 ppm. Deactivated Ru cannot be reactivated or restored except by removing and returning it for remanufacturing. The catalyst in the present invention is in sulfide form and has been demonstrated to possess the stable activity for processing sulfur-containing feedstocks. Another advantage of the catalyst in the present invention is the need for less Ru, a precious metal, compared to the prior art. The Ru loading of the catalyst in the present invention is preferably 0.5-2.0 wt %, with promotion by Mo. A sulfided 0.5 wt % Ru catalyst with 12 wt % Mo surprisingly shows better CHG performance than a sulfided 6.7% Ru catalyst. In addition, the catalyst and process are effective across a large range of organic species in the aqueous feedstock, simultaneously converting carboxylic acids, phenolics, alkanols, aldehydes, and ketones to gaseous products.

BRIEF DESCRIPTION OF THE DRAWINGS

FIG. 1 is a prior art schematic of catalytic hydrothermal gasification (CHG). *Biofuels, Bioprod. Bioref.* 2:254-265 (2008)

FIG. 2 is a graph of COD (chemical oxygen demand) conversion vs TOS (time on stream) of a $Ru/TiO_2$ catalyst with different pretreatment. (Reaction conditions: 350° C., LHSV of 0.54 L/L/h, 2750 psi).

DETAILED DESCRIPTION OF THE INVENTION

Biomass Feedstocks

Figure 3:
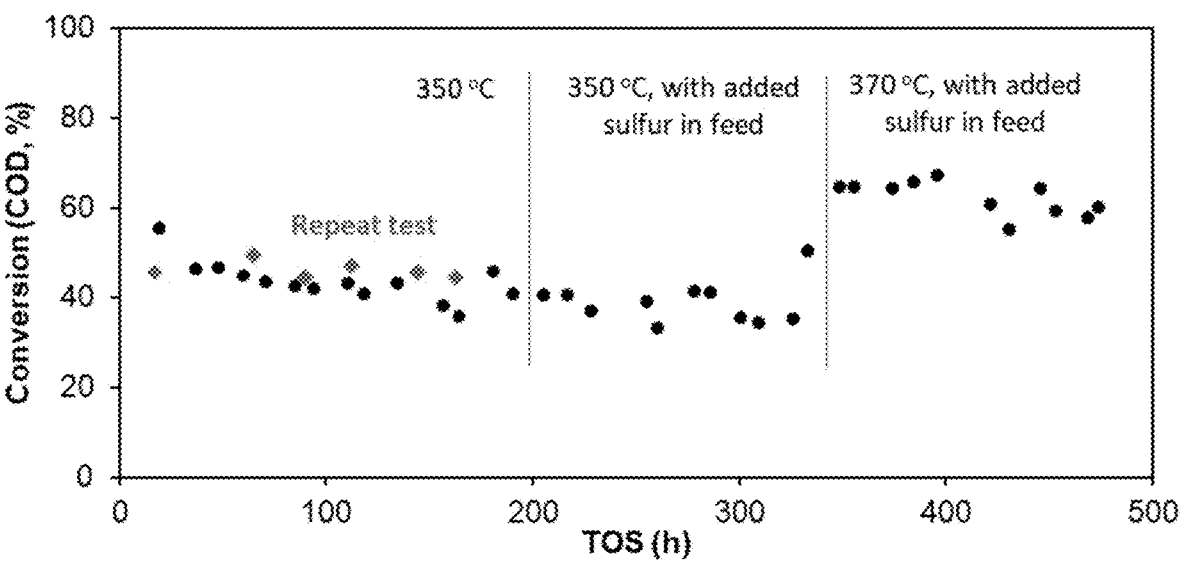
FIG. 3 is a graph of COD conversion of a $RuS_x/C$ catalyst at different times on stream. (Reaction conditions: 350° C. and 370° C., LHSV of 0.54 L/L/h, 2750 psi; raw feed or feed with sulfur added).

"Biomass" refers to carbon-containing material that is derived from biological organisms. It can be differentiated from fossil sources by the presence of [14]C. Exemplary biomass can include, but is not limited to, biosludge from wastewater treatment facilities, sewage sludge from municipal treatment systems, wet byproducts from biorefinery operations, wet byproducts/residues from food processing, animal waste and waste from centralized animal raising facilities, organic chemical manufacturing wastewater streams, and industrial wastewater containing organics. Biomass-containing sources may include molecules such as lignin, carbohydrates, proteins, lipids, triacylglycerides (TAGs), and free fatty acids. Biomass commonly comprises organic matter that can be treated in a continuous reactor, according to embodiments of the present invention, to yield a gas containing hydrogen or useful for hydrogen production (e.g., methane). Common inorganic contaminants, which can poison and/or foul the catalyst, can include but are not limited to sulfur-containing species in both organic and inorganic form. Ca. Mg, P, and/or Fe.

The invention can be characterized by reference to the conversion of aqueous streams produced from HTL of wastewater sludge. Specifically, an HTL aqueous product derived from the HTL of sewage sludge can be used. Some properties of the invention include: when tested using an aqueous product comprising:

COD: 55,000-65,000 mg/L

Total carbon: 1.65-1.80 wt %

Sulfur: 110-140 ppm

Nitrogen: 0.2 to 0.8 wt %

Major organic compounds:

Carboxylic acids (0.8 to 1.4 wt %): acetic acid (0.4 to 0.8 wt %), propanoic acid (0.1 to 0.4 wt %), butanoic acid (0.1 to 0.4 wt %).

Phenolics (0.05 to 0.25 wt %): phenol (0.02 to 0.15 wt %), cresol (0.04 to 0.20 wt %

Alkanols (0.10 to 0.30 wt %): ethanol (0.04 to 0.20 wt %), propanol (0.04 to 0.20 wt %), butanol (up to 0.1 wt %)

Aldehydes and ketones (0/05 to 0.20 wt %): furfural (up to 0.1 wt %), butanone (up to 0.1 wt %), pentanone (up to 0.1 wt %), hexanone (up to 0.1 wt %).

Major inorganic species: Si (up to 300 ppm), K up to 300 ppm), Na (up to 300 ppm) balance is water;

at a temperature of 350° C. or 370° C., LHSV of 0.54 L/L/h, and pressure of 2750 psi;

a steady state conversion of at least 50% COD conversion is maintained for at least 60 hours, or in the range of 60 to 200 hours.

The catalyst and process are effective across a large range of organic species in the aqueous feedstock; simultaneously converting carboxylic acids, phenolics, alkanols, aldehydes, and ketones, presented in the HTL aqueous product and tolerant to sulfur contaminants.

Sulfur Tolerant CHG Catalyst

This invention uses Ru catalyst in sulfide form to enable sulfur tolerance and uses a secondary component, such as Mo, to promote Ru to increase catalyst activity.

To compare the sulfur tolerance of the Ru catalyst in reduced and sulfided form, a 4% Ru/TiO$_2$ catalyst was pretreated in H$_2$ to get reduced Ru and in sulfiding condition to get sulfided Ru and then tested for CHG. The CHG performance of catalysts was tested using a lab-scale continuous flow fixed bed CHG reactor. The performance of the catalyst has been primarily determined by the change of COD in product and feed: COD conversion=100%× (COD$_{feed}$–COD$_{product}$)/COD$_{feed}$. An HTL aqueous product used as feed for the test was derived from the HTL of sewage sludge and its properties were described above. The reaction conditions include a temperature of 350° C. or 370° C., LHSV of 0.54 L/L/h, and pressure of 2750 psi. FIG. 2 shows the COD conversion of the Ru/TiO$_2$ catalyst, pretreated by reduction. The catalyst presented a high initial activity (100% COD reduction), but rapidly deactivated to near the background activity (measured by using carbon support without Ru loading) within 100 hours. This shows the rapid deactivation of the catalyst in reduced form. Such deactivation is because of sulfur poisoning. Ru in sulfide form can also catalyze a similar reaction and is essentially sulfur resistant. As shown in FIG. 2, the Ru/TiO$_2$ catalyst was sulfided under a high H$_2$S/H$_2$ ratio condition to ensure RuS$_x$ formation and then tested under the same conditions. This catalyst also experienced an initial deactivation but reached a steady state after 60 hours of TOS at a COD conversion of around 50%. The results suggested that the Ru sulfide catalyst is much more stable than the reduced Ru catalyst for CHG because it is sulfur-resistant and Ru sulfide had better activity than sulfur-deactivated reduced Ru catalyst.

To further evaluate the stability of Ru catalyst in sulfide form, a test was conducted with the HTL feed described above over a 6.7 wt % Ru on C (Ru/C) catalyst that was presulfided. Testing was conducted for about 480 hours with varied conditions, including: 1) 350° C., LHSV of 0.54 L/L/h, raw feed as described in example 2; 2) 350° C., LHSV of 0.54 L/L/h, feed with 200 ppm sulfur added (in the form of di-tert-butyl disulfide); 3) 370° C., LHSV of 0.54 L/L/h, feed with 200 ppm sulfur added (by blending di-tert-butyl disulfide). A repeat test was conducted at 350° C., LHSV of 0.54 L/L/h, raw feed, and using a catalyst synthesized in a different batch with the same formulation and procedure. The COD conversion at different time-on-stream is presented in FIG. 3. Good repeatability was demonstrated for both catalyst synthesis and CHG testing. This catalyst experienced an initial deactivation but reached a steady state after 50 hours of TOS at a COD conversion of around 40%. Adding 200 ppm sulfur (by blending di-tert-butyl disulfide) in the feed did not influence the activity and stability. A higher reaction temperature (370° C. compared to 350° C.) led to a much-increased COD reduction (from ~40 to 60%). At 350° C., the gas yield in steady-state is around 6.1 L gas/L feed. The produced gas contains 30-35 mol % CH$_4$, 15-30 mol % H$_2$, 10-25 mol % C$_2$+ alkanes, and 20-30 mol % CO$_2$. The results further showed the stability of sulfided Ru catalyst for CHG of HTL aqueous product which contains sulfur.

Figure 4:
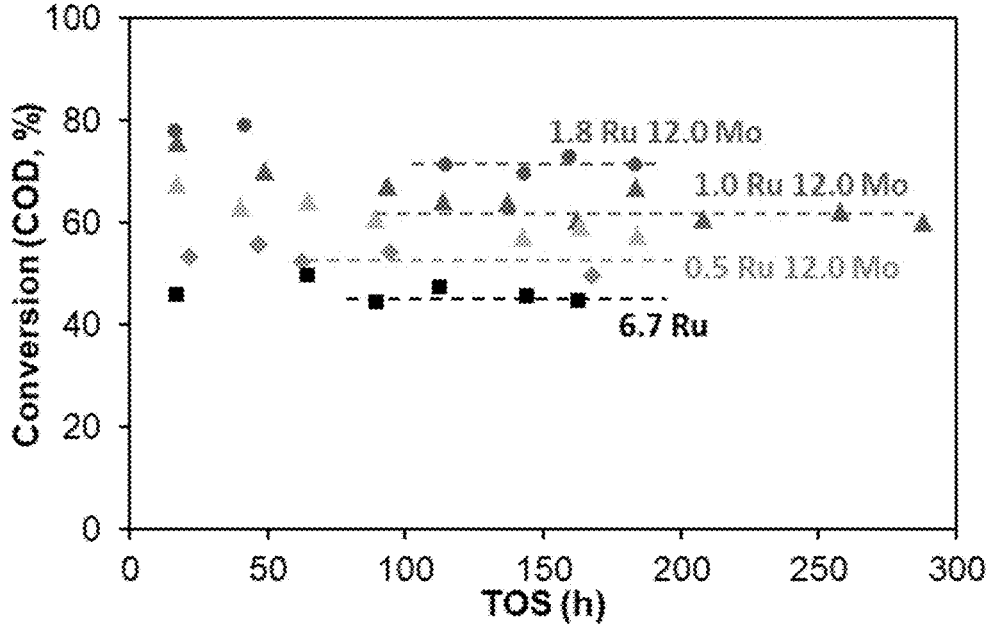
FIG. 4 is a graph of COD conversion of the various $RuMoS_x/C$ catalysts at different times on stream. (Reaction conditions: 350° C. LHSV of 0.54 L/L/h, 2750 psi).

To further increase the CHG activity of the Ru-based sulfide catalyst and reduce Ru usage to decrease overall catalyst cost, a catalyst containing Ru and Mo over carbon support was developed. As shown in FIG. 4, RuMoS$_x$/C catalysts with a much-reduced Ru loading (0.5-2 wt %) showed higher activity than the baseline RuS$_x$/C catalyst (6.7 wt %). This type of catalyst was also stable, as demonstrated by more than 300 hours of TOS testing. Higher activity was achieved with a higher Ru loading. It suggests that the catalyst combining both Ru and Mo in sulfide form enables a much more reactive CHG with reduced Ru loading in processing sulfur containing feedstocks. We hypothesize that Mo enables greater dispersion of Ru and possible promotion by electronic Ru—Mo interaction.

Catalysts may be synthesized by impregnating metal precursor compounds onto carbon or metal oxide supports. One Ru precursor compound may be ruthenium (Ru) nitrosyl nitrate in an aqueous solution. A Mo precursor compound may be ammonium heptamolybdate in an aqueous solution. Catalysts may be sulfided in the reactor prior to the CHG testing.

CHG Catalyst System

The catalyst may be used in a tubular fixed-bed reactor. The biomass feedstock may be introduced to the reactor from the bottom of the reactor to achieve continuous up-flow when passing through the catalyst bed. Reactor types are not limited. Reactors suitable for use in concert with the present invention include, but are not limited to, e.g., fixed-bed reactors, fluidized bed reactors, circulating fluid-bed (CFB)

reactors, rotating cone (RC) reactors, batch reactors, batch-flow reactors, packed-bed reactors, tubular reactors, multi-tubular reactors, network reactors, heat-exchange reactors, gas-liquid reactors, gas solid reactors, radial-flow reactors, reverse flow reactors, ring reactors, moving bed reactors, catalytic reactors, non catalytic reactors, chemical reactors, gas reactors, trickle bed reactors, column reactors, batch reactors, N dimensional reactors, N phase reactors, heated reactors, cooled reactors, including combinations and components of these various reactors.

Figure 5:
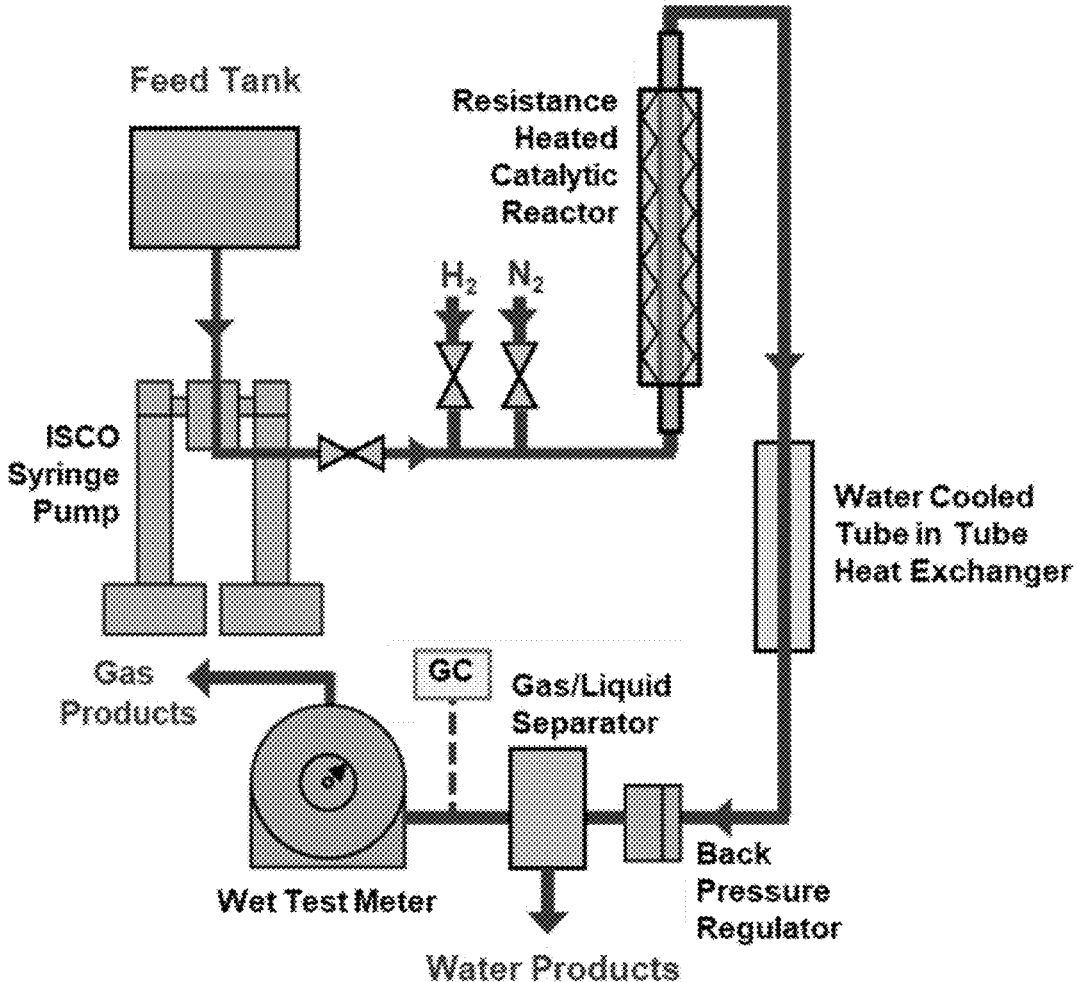
FIG. 5 is a scheme of a bench-scale fixed bed reactor system used for CHG.

FIG. 5 shows an exemplary fixed bed reactor, which is a bench-scale (25 ml catalyst capacity) reactor. Reactor may be charged with a selected CHG catalyst. The reactor system may include a liquid feed (introduction) system such as a high-pressure metering syringe pump (e.g., a dual-head pump. Teledyne-ISCO, Inc., Lincoln, NE, USA) or other introduction device that delivers a liquid feed into the reactor. Liquid feed may enter, e.g., from the bottom of the reactor and be passed through the catalyst at a selected temperature and pressure. Temperature of the reactor and catalyst may be controlled and monitored, e.g., with heating devices and temperature measuring devices (e.g., thermocouples) known in the reactor art. Pressure of the reactor and catalyst may be controlled and monitored, e.g., with the back pressure regulator and pressure measuring devices (e.g., pressure gauges and pressure transducers) known in the reactor art. After exiting the reactor, the products may be cooled to ambient temperature with, e.g., water cooled tube-in-tube heat exchanger and be separated into the gaseous products and water products in a gas liquid separator placed downstream from reactor. Water product may be recovered, weighed, and/or sampled as needed for analysis. Gaseous products may be analyzed by an on-line micro-GC for its composition. Gaseous products may pass through a gas meter (e.g., a RITTER® wet test gas flow meter, Calibrated Instruments, Inc., Hawthorne, NY, USA) to measure gas volumes.

Preferably, the entire catalytic hydrothermal gasification occurs at conditions in which water is below its critical point (i.e., sub-critical). In a particular embodiment, the wet biomass feedstock is heated to at least 300° C. In another embodiment, a catalytic reactor containing the heterogeneous catalyst is heated to a temperature between 250° C. and 374° C. The pressure in the catalytic reactor can be up to 23 M Pa. In a preferred embodiment the catalytic reactor is operated at temperatures between 340° C. and 360° C. and pressures between 18 MPa and 21 MPa.

The LHSV may be varied between 0.1 to 2.0 L/L/h. In a preferred embodiment, the LHSV is kept at 0.54 L/L/h. LHSV stands for liquid hourly space velocity and is calculated as the volume of feed (measured in liters) per hour at a temperature of 20° C., divided by the volume of the catalyst (measured in liters).

CHG Process

Figure 6:
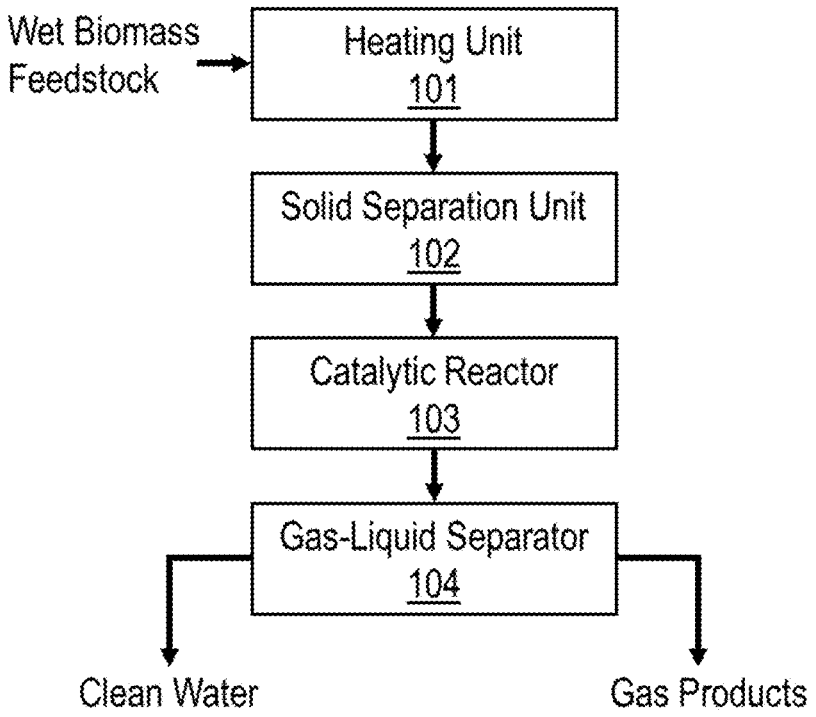
FIG. 6 is a schematic illustration of one embodiment of a flow process.

A schematic illustration of one embodiment of a flow process is shown in FIG. 6. As shown in FIG. 6, a biomass-derived aqueous product or wet biomass slurry can be preheated in a heating unit (101) and solids can be removed in a solid separation unit (102). Separation of solids from the heated feedstock can be achieved using a solids separation unit, which can include, but is not limited to, a gravity separation unit, a hydrocyclonic separation unit, and/or a filtration unit. The cleaned stream is catalytically reacted under hydrothermal conditions in a catalytic reactor (103). Output from the catalytic reactor (typically in a continuous stream, but optionally in a batch process) can be passed through a gas/liquid separator (104). Additional separations may be conducted by known methods including any of the separation methods mentioned above.

Heat exchangers may also be positioned to recover heat that preheats biomass feedstocks introduced to the CHG; to deliver heat to selected processes employed in conversion of biomass feedstocks in the CHG; to provide finishing heat needed to bring effluent streams to process temperatures; to recover heat from various aqueous stream effluents that may be distributed to preheat biomass feedstocks introduced to the CHG process; to provide heat to other stages employed in the conversion of biomass feedstocks; to provide "finishing" heat needed to bring aqueous effluents to full stage process temperatures; including combinations of these various purposes. Heat exchangers suitable for use include, but are not limited to, counter-current heat exchangers; burner-type heat exchangers; make-up heat exchangers and heaters; and combinations of these.

Although not required, the source of biomass for the CHG process can be a product from hydrothermal liquefaction (HTL). Thus, the present invention includes a combined hydrothermal liquefaction and catalytic hydrothermal gasification (HTL-CHG) system for the conversion of biomass to bio-oils and recovery and conversion of residual organics in aqueous effluent streams to bio-based fuels and other value-added chemicals. The system may include a first HTL stage that converts biomass in an aqueous medium at a temperature and pressure selected to form a conversion product that includes a separable bio-oil and an aqueous fraction containing residual organics. The aqueous fraction containing residual organics may be introduced as an effluent stream from the HTL stage reactor directly into a catalytic hydrothermal gasification (CHG) stage reactor at a temperature and pressure selected to form a product gas containing at least one hydrocarbon or other medium BTU product gas. Combustion of the product gas may be performed to provide a net positive release of energy from conversion of the biomass. Minerals obtained from the aqueous stream in the CHG may be used as nutrients for growth of plants or another biomass source from which biomass may be grown and harvested for use in another biomass conversion cycle in the HTL-CHG system.

EXAMPLES

Example 1. Catalyst Synthesis and Pretreatment

CHG catalysts may be prepared by impregnating metal precursor compounds onto carbon or metal oxide supports. Support in extrudate form with a selected extrudate size (0.20 mm to 5.0 mm) may be used. Therefore, the prepared catalysts may include a selected extrudate size (0.20 mm to 5.0 mm).

In one example, ruthenium on carbon catalyst (6.7 wt % Ru: 92.3 wt % carbon) was prepared by impregnating activated carbon (Norti ROX 0.8 activated carbon, rodlike extrudate with 0.8 mm diameter and 5 mm length, from Norit) as the support with an aqueous solution containing ruthenium (Ru) nitrosyl nitrate as a metal precursor solution. The catalyst may be dried at 60-120° C. and ready for activation by sulfidation in the CHG reactor prior to CHG tests.

In another example, ruthenium on titania metal oxide catalyst (4.0 wt % Ru: 96 wt % metal oxide $TiO_2$) was prepared by impregnating titania (P25 $TiO_2$, Evonik Industries, Essen, Germany) as the solid metal oxide support with an aqueous solution containing ruthenium (Ru) nitrosyl nitrate as a metal precursor solution.

In another example, ruthenium and molybdenum on carbon catalyst (1.8 wt % Ru, 12.0 wt % Mo, 86.2 wt % carbon) was prepared by impregnating activated carbon (Norti ROX 0.8 activated carbon, rodlike extrudate with 0.8 mm diameter and 5 mm length, from Norit) as the support with an aqueous solution containing ruthenium (Ru) nitrosyl nitrate and ammonium heptamolybdate as a metal precursor solution. Specifically, the synthesis procedure includes: 1) wash the carbon with hot deionized (DI) water until the spent wash water containing dissolved solid <30 ppm by TDS (total dissolved solids) meter reading and then dry the washed carbon support at 110° C. for 12 hours; 2) Prepare a solution of molybdenum precursor by dissolving $(NH_4)_6Mo_7O_{24}4H_2O$ in DI water and prepare a solution of ruthenium precursor by dissolving $Ru(NO)(NO_3)_x(OH)_y$ in DI water; 3) conduct impregnation of molybdenum precursor by adding the molybdenum precursor solution to the dried carbon support in a rotating beaker, continuing rotating the impregnated sample at room temperature for 1 hour, and drying at 60° C. for 2 hours, 90° C. for 2 hours, and 110° C. for 12 hours; 4) conduct impregnation of ruthenium precursor by adding the ruthenium precursor solution to the dried molybdenum loaded carbon support in a rotating beaker, continuing rotating the impregnated sample at room temperature for 1 hour, and drying at 75° C. in vacuum over for 12 hours. The synthesized catalyst was analyzed by inductively coupled plasma-optical emission spectroscopy (ICP-OES) and showed 1.8 wt % Ru and 12.1 wt % Mo with a Ru/Mo molar ratio of 1:7.3.

In another example, ruthenium and molybdenum on carbon catalyst (1.0 wt % Ru, 12.0 wt % Mo, 87 wt % carbon) was prepared by impregnating activated carbon (Norti ROX 0.8 activated carbon, rodlike extrudate with 0.8 mm diameter and 5 mm length, from Norit) as the support with an aqueous solution containing ruthenium (Ru) nitrosyl nitrate and ammonium heptamolybdate as a metal precursor solution. The specific preparation procedure is the same as that for the ruthenium and molybdenum on carbon catalyst (1.8 wt % Ru, 12.0 wt % Mo, 85.9 wt % carbon).

In a further example, ruthenium and molybdenum on carbon catalyst (0.5 wt % Ru, 12.0 wt % Mo, 87.5 wt % carbon) was prepared by impregnating activated carbon (Norti ROX 0.8 activated carbon, rodlike extrudate with 0.8 mm diameter and 5 mm length, from Norit) as the support with an aqueous solution containing ruthenium (Ru) nitrosyl nitrate and ammonium heptamolybdate as a metal precursor solution. The specific preparation procedure is the same as that for the ruthenium and molybdenum on carbon catalyst (1.8 wt % Ru, 12.0 wt % Mo, 85.9 wt % carbon).

The catalyst may be sulfided in the reactor prior to the CHG testing. The sulfidation conditions include: a temperature of 200° C. to about 450° C., preferably 350° C.; a pressure of 1.0 to 12.5 MPa, preferably 8.3 MPa; hydrogen flow of 100-2000 L $H_2$/L catalyst/h, preferably 600 L $H_2$/L catalyst/h; sulfiding agent of $H_2S$ or organic sulfur-containing compounds in an organic solvent, such as 35 wt % di-tert-butyl disulfide in decane with a liquid sulfiding agent flow rate of 10-50 L/L catalyst/h, preferably 20 L/L catalyst/h.

The sulfidation may convert the as-prepared catalyst to sulfide form. ICP-OES results of sulfided ruthenium and molybdenum on carbon catalyst (1.8 wt % Ru, 12.0 wt % Mo, 86.2 wt % carbon) showed a sulfur content of 10 wt % with a Ru/Mo/S ratio of 1:7.1:18. X-ray Powder Diffraction (XRD) and X-ray Absorption Spectroscopy (XAS, Ru K-edge) measurements were performed on the sulfided ruthenium and molybdenum on carbon catalyst (1.8 wt %

Figure 7:
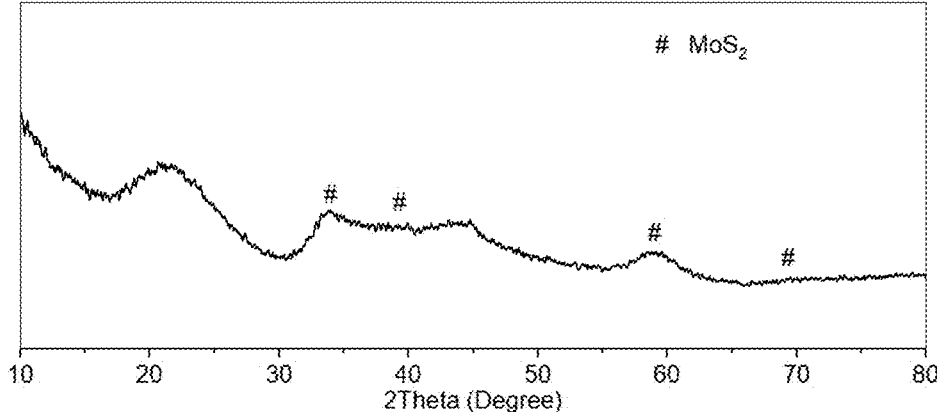
FIG. 7 is an XRD (X-ray powder diffraction) pattern of a ruthenium and molybdenum on carbon catalyst (1.8 wt % Ru, 12.0 wt % Mo, 85.9 wt % carbon) after sulfidation.
Figure 8:
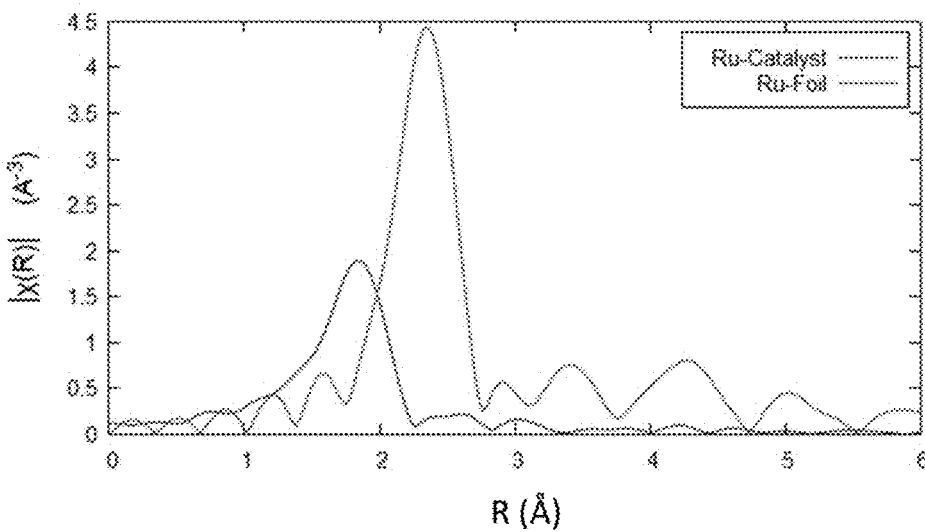
FIG. 8 is a Fourier-transformed EXAFS spectra of the ruthenium and molybdenum on carbon catalyst (1.8 wt % Ru, 12.0 wt % Mo, 85.9 wt % carbon) after sulfidation with a ruthenium foil as reference.

Ru, 12.0 wt % Mo, 86.2 wt % carbon). As shown in FIG. 7 for the XRD results, no sharp peaks were observed, suggesting the high dispersion of the active phases. The broad peaks observed can be assigned to $MoS_2$. FIG. 8 illustrates the Fourier transform Extended X-ray Absorption Fine Structure (EXAFS) spectrum of the catalyst. It reveals a prominent peak at approximately 1.85 Å, indicating the presence of Ru—S coordination. There is no apparent Ru—Ru coordination observed, which is typically seen in Ru metal (reference Ru foil) or bulk $RuS_2$. This result suggests that Ru exists in a sulfide form and is well dispersed within the catalyst. However, the exact structure of the catalyst's active phase, regarding the arrangement of $RuS_2$ with $MoS_2$, is unclear.

Example 2. Performance of the 1.8 wt % Ru and 12 wt % Mo RuMoSx/C Catalyst

The CHG performance of catalysts was tested using a lab-scale continuous flow fixed bed CHG reactor. Feed or sulfiding agent was introduced to the reactor system by a high-pressure metering syringe pump. The hydrogen flow rate was controlled by a mass flow controller. Temperatures of the catalyst beds were monitored with thermocouples. Liquid products were collected every 12 hours for analysis. Gas products were measured by a wet test meter for this volume and an online micro-GC for its composition. The liquid samples were analyzed by chemical oxygen demand (COD) measurement, HPLC, ICP, and CHN elemental analysis. The performance of the catalyst has been primarily determined by COD conversion:

$$COD \text{ conversion} = 100\% \times (CODfeed - CODproduct)/CODfeed.$$

The spent catalysts have been analyzed by ICP-OES (for metal loading and possible inorganic contamination) and other characterization techniques.

An HTL aqueous product used as feed for the test was derived from the HTL of sewage sludge. Some properties of the HTL aqueous product include:
  COD: 55,000-65,000 mg/L
  Total carbon: 1.65-1.80 wt %
  Sulfur: 110-140 ppm
  Nitrogen: ~0.5 wt %
  Major organic compounds:
    Carboxylic acids (1.09 wt %): acetic acid (0.60 wt %), propanoic acid (0.23 wt %), butanoic acid (0.22 wt %).
    Phenolics (0.13 wt %): phenol (0.05 wt %), cresol (0.08 wt %
    Alkanols (0.18 wt %): ethanol (0.09 wt %), propanol (0.08 wt %), butanol (0.01 wt %)
    Aldehydes and ketones (0.08 wt %): furfural (0.01 wt %), butanone (0.02 wt %), pentanone (0.02 wt %), hexanone (0.01 wt %).
  Major inorganic species: Si (~200 ppm), K (~200 ppm), Na (~100 ppm)
The reaction conditions include a temperature of 350° C. or 370° C., LHSV of 0.54 L/L/h, and pressure of 2750 psi.

Testing was conducted over the ruthenium and molybdenum on carbon catalyst (1.8 wt % Ru, 12.0 wt % Mo, 86.2 wt % carbon) prepared in Example 1. The catalyst was presulfided as described in Example 1. CHG test was conducted for about 200 hours at 350° C. and LHSV of 0.54 L/L/h. The COD conversion at different time-on-stream is presented in FIG. 4. This catalyst experienced an initial deactivation but reached a steady state after 80 hours of TOS at a COD conversion of around 71%. The produced gas yield is around 7.5 L/L feed and contains about 44 mol % $CH_4$, 5 mol % $H_2$, 15 mol % $C_2$+ alkanes, and 38 mol % $CO_2$. ICP analysis of the spent catalyst did not show a noticeable loss of Ru or Mo during the test.

Example 3. Performance of the 1 wt % Ru and 12 wt % Mo RuMoSx/C Catalyst

Testing was conducted with the HTL aqueous product described in Example 2 as the feed over the ruthenium and molybdenum on carbon catalyst (1.0 wt % Ru, 12.0% Mo, 86.2% carbon) prepared in Example 1. The catalyst was presulfided as described in Example 1. CHG test was conducted for about 300 hours at 350° C. and LHSV of 0.54 L/L/h. A repeat test was conducted at the same condition and using a catalyst synthesized in a different batch with the same formulation and procedure. The COD conversion at different times on stream is presented in FIG. 4. This catalyst experienced an initial deactivation but reached a steady state after 80 hours of TOS at a COD conversion of around 60%. The produced gas yield is around 6.0 L/L feed and contains about 42 mol % $CH_4$, 10 mol % $H_2$, 10 mol % $C_2$+ alkanes, and 33 mol % $CO_2$. ICP analysis of the spent catalyst did not show a noticeable loss of Ru or Mo during the test.

Example 4. Performance of the 0.5 wt % Ru and 12 wt % Mo RuMoSx/C Catalyst

Testing was conducted with the HTL aqueous product described in Example 2 as the feed over the ruthenium and molybdenum on carbon catalyst (0.5 wt % Ru, 12.0 wt % Mo, 86.2 wt % carbon) prepared in Example 1. The catalyst was presulfided as described in Example 1. CHG test was conducted for about 300 hours at 350° C. and LHSV of 0.54 L/L/h. The COD conversion at different time-on-stream is presented in FIG. 4. This catalyst showed a COD conversion of around 52% at the steady state.

All of the results demonstrated that the RuMoSx/C catalysts are stable for CHG of HTL aqueous products and its activity increases with increasing the Ru loading from 0.5 to 1.8 wt %. The catalysts with a Ru loading of 0.5 wt % showed better activity than the Ru-only catalyst with a 6.7 wt % Ru loading.

Example 5. Performance of the RuMoSx/C Catalyst in a Two-Pass Test

Figure 9:
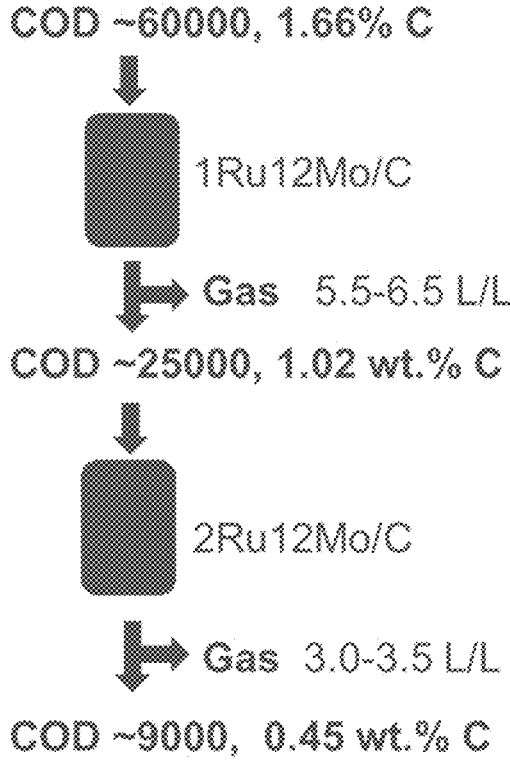
FIG. 9 is a flow diagram showing two-pass CHG using a $RuMoS_x/C$ catalyst. (Reaction conditions: 350° C., LHSV of 0.54 L/L/h, 2750 psi).

The best RuMoS$_x$/C sulfide catalyst reported here can reach a 71% COD reduction at 350° C. and LHSV of 0.54 L/L/h. A higher reaction temperature could lead to a higher conversion with the challenges of maintaining condensed phase operation. A lower space velocity did not result in a much higher COD conversion and also brought challenges in lower reactor throughput. To achieve a higher COD conversion (>90%), a two-pass reaction was conducted and included the collection of water produced from the first pass and feeding them to a second reactor. As shown in FIG. 9, the single-pass COD reduction is ~60% and two-pass COD reduction can reach ~85%, by using the RuMoS$_x$/C catalyst. Total gas production was 8.5-10 L gas per L feed. The gas product contains 40-45 mol % methane, 5-10 mol % $H_2$, 10-15 mol % $C_2$+ alkanes, and 30-40 mol % $CO_2$.

What is claimed:

1. A CHG catalyst, comprising: a mixture of Ru and Mo disposed on the surface of a support;
   wherein the support comprises carbon or a metal oxide;
   Ru in a range of 0.1 to 10 wt %;
     Mo in a range of 1 to 30 wt %; and
     S in a range of 1 to 30 wt %.
2. The CHG catalyst of claim 1 wherein Ru is preferably 0.2 to 5 wt or 0.2 to 3 wt %; Mo is 2 to 25% or 5 to 25%, or 8 to 20%; and wherein the support comprises at least 50 wt %, or at least 60 or at least 70 wt % of the catalyst.
3. The catalyst of claim 2 further comprising at least 1 wt % W.
4. The catalyst of claim 1 wherein the support comprises C, $TiO_2$ or $ZrO_2$.
5. The catalyst of claim 4 wherein the support comprises activated carbon.
6. The catalyst of claim 1 wherein the Mo is in the form of sulfided Mo.
7. The catalyst of claim 1 wherein the Ru is in the form of sulfided Ru.
8. The catalyst of claim 1 wherein the atomic ratio of Ru/Mo is in the range of 1/50 to 1/1 and the atomic ratio of S/(Ru+Mo) is in the range of 1/5 to 3/1.
9. The catalyst of claim 1 having a catalyst stability characterizable as follows:
   when tested using an aqueous product comprising:
     COD: 55,000-65,000 mg/L
     Total carbon: 1.65-1.80 wt %
     Sulfur: 110-140 ppm
     Nitrogen: 0.2 to 0.8 wt %
     Major organic compounds:
       Carboxylic acids (0.8 to 1.4 wt %): acetic acid (0.4 to 0.8 wt %), propanoic acid (0.1 to 0.4 wt %), butanoic acid (0.1 to 0.4 wt %),
       Phenolics (0.05 to 0.25 wt %): phenol (0.02 to 0.15 wt %), cresol (0.04 to 0.20 wt %
       Alkanols (0.10 to 0.30 wt %): ethanol (0.04 to 0.20 wt %), propanol (0.04 to 0.20 wt %), butanol (up to 0.1 wt %)
       Aldehydes and ketones (0/05 to 0.20 wt %): furfural (up to 0.1 wt %), butanone (up to 0.1 wt %), pentanone (up to 0.1 wt %), hexanone (up to 0.1 wt %),
     Major inorganic species: Si up to 300 ppm), K up to 300 ppm), Na (up to 300 ppm) balance is water;
   at a temperature of 350° C. or 370° C., LHSV of 0.54 L/L/h, and pressure of 2750 psi;
   a steady state conversion of at least 50% COD conversion is maintained for at least 60 hours, or in the range of 60 to 200 hours.
10. The catalyst of claim 1 wherein the catalyst lacks crystallites as characterizable by the absence of sharp peaks in an x-ray diffraction spectrum.
11. The catalyst of claim 1 wherein the catalyst comprises $MoS_2$ as characterizable by an x-ray diffraction spectrum.
12. The catalyst of claim 1 wherein the catalyst comprises Ru—S coordination but no Ru—Ru coordination as characterizable by EXAFS.
13. A catalyst system, comprising:
   a reactor vessel comprising an aqueous mixture of the CHG catalyst of claim 1 and biomass.
14. The catalyst system of claim 13 at a temperature of 350° C. to 370° C.

15. A method of converting a biomass feedstock into vapor products, comprising:

providing an aqueous biomass mixture;

passing the mixture into a chemical reactor comprising the catalyst of claim 1 under hydrothermal conditions of at least 150° C. but below supercritical conditions;

wherein the mixture reacts in the chemical reactor, and collecting a vapor product stream from the chemical reactor.

16. A method of making a CHG catalyst, comprising:

providing a catalyst intermediate comprising: Ru in a range of 0.1 to 10 wt % and Mo in a range of 1 to 30 wt % on a catalyst support; and sulfiding the catalyst at a temperature from about 200° C. to about 450° C. in the presence of a sulfiding agent.

17. The method of claim 16 further wherein the sulfiding step is conducted in the presence of $H_2$.

18. The method of claim 16 wherein the sulfiding agent comprises $H_2S$ and, optionally, other sulfur-containing organics.

19. The method of claim 16 wherein the sulfiding agent comprises di-tert-butyl disulfide.

20. The method of claim 16 wherein the sulfiding step is conducted in an organic solvent.

21. The method of claim 20 wherein the organic solvent is decane.

* * * * *